(12) United States Patent
Yows et al.

(10) Patent No.: US 8,673,234 B2
(45) Date of Patent: Mar. 18, 2014

(54) REACTOR VESSEL AND LINER

(75) Inventors: Stephen Arthur Yows, Moorpark, CA (US); Steven P. Fusselman, Simi Valley, CA (US); Bryan William McEnerney, Woodland Hills, CA (US); Kenneth M. Sprouse, Northridge, CA (US)

(73) Assignee: Aerojet Rocketdyne of DE, Inc., Sacramento, CA (US)

( * ) Notice: Subject to any disclaimer, the term of this patent is extended or adjusted under 35 U.S.C. 154(b) by 1495 days.

(21) Appl. No.: 12/041,713

(22) Filed: Mar. 4, 2008

(65) Prior Publication Data

US 2009/0226349 A1 Sep. 10, 2009

(51) Int. Cl.
*B01J 19/00* (2006.01)
*F23M 5/00* (2006.01)

(52) U.S. Cl.
USPC ........... 422/241; 422/205; 422/201; 422/198; 60/752; 60/755; 110/336

(58) Field of Classification Search
USPC ................. 422/241, 221, 205, 201, 200, 198; 60/752, 755; 110/336
See application file for complete search history.

(56) References Cited

U.S. PATENT DOCUMENTS

| | | | |
|---|---|---|---|
| 2,879,660 A | 3/1959 | Reintjes | |
| 2,987,788 A | 6/1961 | Lyman | |
| 3,918,255 A | 11/1975 | Holden | |
| 4,188,915 A | 2/1980 | Danguillier | |
| 4,567,730 A * | 2/1986 | Scott | 60/757 |
| 4,838,030 A | 6/1989 | Cramer | |
| 4,869,207 A | 9/1989 | Engstrom | |
| 5,248,483 A | 9/1993 | Carter | |
| 6,418,973 B1 | 7/2002 | Cox | |
| 6,720,087 B2 * | 4/2004 | Fried et al. | 428/614 |
| 6,758,386 B2 | 7/2004 | Marshall | |
| 6,920,836 B2 | 7/2005 | Sprouse | |
| 6,982,506 B1 | 1/2006 | Johnsen | |
| 7,037,473 B1 | 5/2006 | Donner | |
| 2002/0157312 A1 | 10/2002 | Adler | |
| 2004/0071618 A1 | 4/2004 | Sprouse | |
| 2006/0010874 A1 | 1/2006 | Intile et al. | |
| 2006/0045827 A1 | 3/2006 | Sprouse | |
| 2006/0210457 A1 | 9/2006 | Sprouse | |
| 2006/0242907 A1 | 11/2006 | Sprouse | |
| 2006/0243583 A1 | 11/2006 | Sprouse | |
| 2008/0141913 A1 * | 6/2008 | Yows et al. | 110/336 |

FOREIGN PATENT DOCUMENTS

| | | |
|---|---|---|
| CN | 1427879 | 7/2003 |
| DE | 3009850 | 9/1981 |
| DE | 3120238 | 12/1982 |
| EP | 1939271 | 7/2008 |
| EP | 1956327 | 8/2008 |
| GB | 2094955 | 9/1982 |
| WO | 2006054139 | 5/2006 |

OTHER PUBLICATIONS

International Search Report and Written Opinion dated Jan. 8, 2010.
Chinese Search Report for Chinese Patent Application No. 200980107633.X completed Jan. 6, 2013.

* cited by examiner

*Primary Examiner* — Lessanework Seifu
(74) *Attorney, Agent, or Firm* — Carlson, Gaskey & Olds, P.C.

(57) ABSTRACT

A reactor vessel liner system includes a liner having an inner wall, an outer wall, and a plurality of passages extending between the inner wall and the outer wall. An attachment member extends outwards from the outer wall for securing the liner.

21 Claims, 2 Drawing Sheets

REACTOR VESSEL AND LINER

BACKGROUND OF THE INVENTION

This disclosure relates to a reactor vessel and cooled liner.

Reactor vessels, such as carbonaceous fuel gasifiers for producing synthesis gas, typically operate at elevated temperatures. For example, the temperature in a carbonaceous fuel gasifier may be near 3000° F. (1649° C.). The reactor vessel may include an internal liner that protects the reactor vessel from the elevated temperatures, which may be approximately 1200° F. (649° C.) at the liner.

A variety of different types of liners are known. For example, one type of liner includes refractory tiles that insulate the reactor vessel from the high temperatures. However, one drawback of using refractory tiles is that the tiles may become damaged in a relatively short period of time and require replacement, which increases the operating expense of the reactor vessel. Additionally, reactor vessels that utilize refractory tiles may require relatively long warm-up or cool-down periods to avoid thermal shock damage.

Another type of liner includes coolant channels for circulating water to cool the liner. For example, the liner is formed from spaced-apart ceramic panels, with walls between the panels that form the coolant channels. The ceramic panels are secured to the metal reactor vessel or other metal components used with the reactor vessel, such as heat exchanger components. Although effective for cooling and more durable than refractory tiles, a thermal expansion mismatch between the ceramic panels and the metal of the attached reactor vessel or component may be undesired in some reactor vessel designs.

SUMMARY OF THE INVENTION

The disclosed examples provide a relatively simple, long life, and low cost reactor vessel system and liner system arrangement for facilitating reduction in thermal stresses.

An example reactor vessel liner system includes a liner having an inner wall, an outer wall, and a plurality of passages extending between the inner wall and the outer wall. An attachment member extends outwards from the outer wall for securing the liner. For example, the reactor vessel liner system lines a vessel wall of a reactor vessel system and circulates a coolant through the plurality of passages to thereby cool the reactor vessel.

An example method for securing a liner of a reactor vessel system includes securing one end of the liner to a reactor vessel of the reactor vessel system such that another end of the liner is substantially free to thermally expand and contract relative to the reactor vessel.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
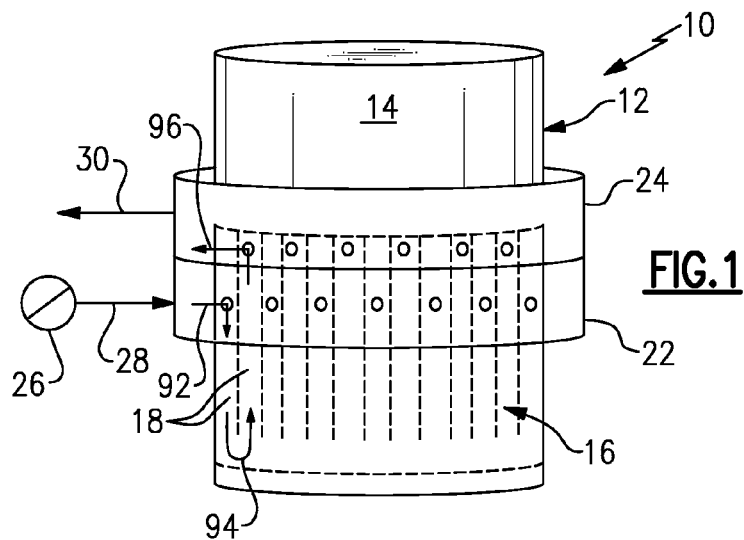
FIG. 1 illustrates an example reactor vessel system.

FIG. 1 illustrates selected portions of an example reactor vessel system 10, such as a carbonaceous fuel gasifier for producing synthesis gas. It is to be understood that the example reactor vessel system 10 as shown may include additional components, such as those related to feeding carbonaceous fuel and reaction gas. The reactor vessel system 10 includes a reactor vessel 12 having a gasifier injector 13 (FIG. 4) contained in a vessel wall 14. For example, the reactor vessel 12 may be used to contain reactions that produce temperatures exceeding 3000° F. (1649° C.) and temperatures of approximately 1200° F. (649° C.) or higher near the internal surface of the vessel wall 14. In this regard, the reactor vessel system 10 includes a liner 16 for protecting the vessel wall 14 from the elevated temperatures and gases within the reactor vessel 12.

As will be described, the liner 16 provides a relatively simple assembly for maintaining a desired temperature at the vessel wall 14 of the reactor vessel 12 and facilitates reduction of thermal stress between the liner 16 and other components of the reactor vessel system 10. As can be appreciated, the liner 16 according to this disclosure is exemplary and, given this description, variations and modifications may become apparent to those skilled in the art.

The liner 16 includes a plurality of passages 18 for conveying a coolant, such as water or a water mixture, through the liner 16 to control the temperature. An inlet manifold 22 and an outlet manifold 24 extend around the perimeter of the reactor vessel 12. The inlet manifold 22 delivers the coolant to the liner 16 and the outlet manifold 24 collects the coolant from the liner 16. For example, a pump 26 may be used to convey the coolant through a supply line 28 to the inlet manifold 22 and circulate the coolant through the passages 18. The coolant discharges from the outlet manifold 24 to an outlet line 30 and may subsequently be cooled and recirculated through the liner 16, or may be used as a reactant input into the reactor vessel 12, for example.

Figure 2:
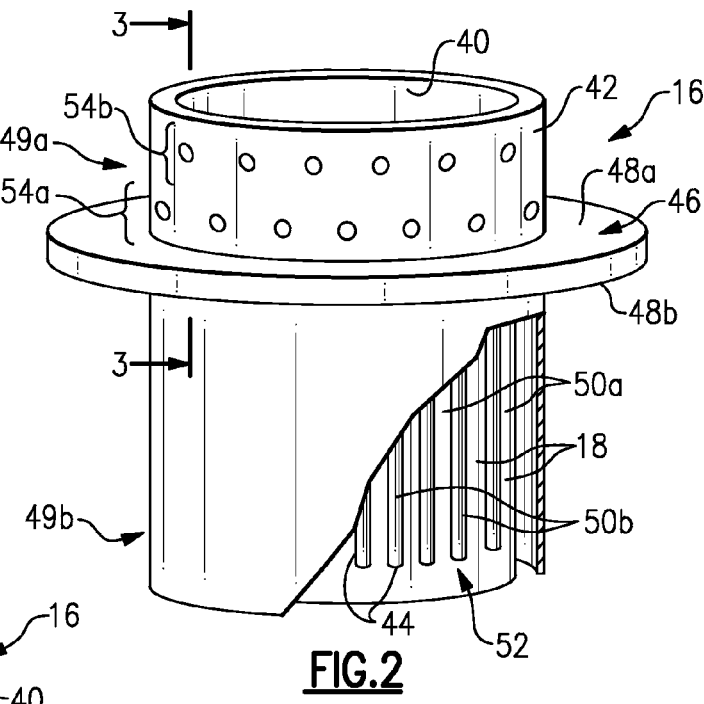
FIG. 2 illustrates an example liner of the reactor vessel system.

FIG. 2 illustrates an isolated view of the liner 16. The liner 16 includes an inner wall 40 and an outer wall 42 that generally form a hollow cylindrical shape. It is to be understood that other shapes may be used. The passages 18 extend between the inner wall 40 and the outer wall 42 and are separated by partition walls 44. The liner 16 may be manufactured using any suitable technique. In one example, the inner wall 40, the outer wall 42, and/or the partition walls 44 are separate pieces that are brazed together to form the liner 16, which may be formed as arc sections that are attached together to form the cylindrical shape.

An attachment member 46 extends outwards from the outer wall 42 for attaching the liner 16 to the vessel wall 14 of the reactor vessel system 10, as will be described below. As can be appreciated, the attachment member 46 may have any shape that is suitable for attaching the liner 16. For example, the attachment member 46 in the illustrated example is a flange that extends approximately perpendicularly from the outer wall 42. The flange includes an upper surface 48a and a lower surface 48b that is approximately parallel to the upper surface 48a. The flange extends completely around the circumference of the liner 16 to facilitate uniform attachment of the liner 16 to the vessel wall 14.

In the illustrated example, the attachment member 46 is located proximate to a first end 49a. That is, the attachment member 46 is closer to the first end 49a than to a second end 49b of the liner 16. Locating the attachment member 46 proximate to the first end 49a facilitates reduction of thermal stresses that may result from differences in coefficients of thermal expansion between materials used for the liner 16 and the vessel walls 14, for example, as will be described more below.

The passages 18 of the liner 16 include first passages 50a (e.g., down-flow passages) and second passages 50b (e.g., up-flow passages). Each of the first passages 50a is directly fluidly connected with at least one of the second passages 50b through a turn manifold 52 to form a circulation path between the inlet manifold 22 and the outlet manifold 24. Alternatively, the one or more of the partition walls 44 may extend to the bottom of the liner 16 such that some of the passages 18 are partitioned from other passages 18.

The liner 16 includes a plurality of coolant entry ports 54a and a plurality of coolant exit ports 54b that extend through the outer wall 42. For example, the ports 54a and 54b are openings formed in the outer wall 42, such as by machining. The coolant entry ports 54a fluidly connect the first passages 50a with the inlet manifold 22, and the coolant exit ports 54b fluidly connect the second passages 50b with the outlet manifold 24.

Figure 3:
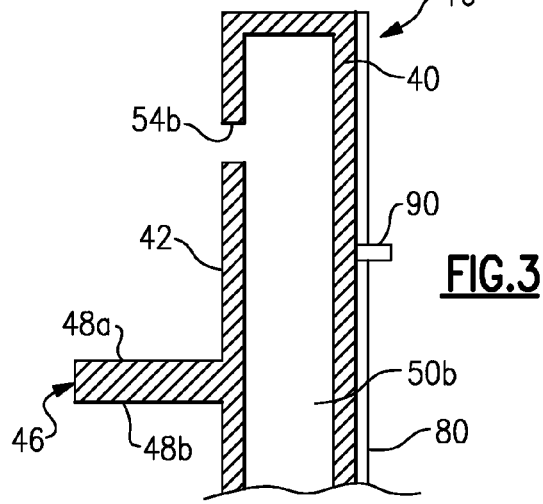
FIG. 3 illustrates a section of the liner.

Referring also to the section of the liner 16 shown in FIG. 3, the liner 16 may also include a non-slag coating 80 disposed on at least the inner wall 40 to protect the liner 16 from erosion and corrosion, and/or to facilitate formation of a slag layer on the inner wall 40. Although a layer of slag may form on the inner wall 40, the non-slag coating 80 refers to a pre-deposited layer on the inner wall 40, not the slag.

The coating 80 may be comprised of a metal alloy. For example, the coating 80 may include MCrAlY, where the M includes at least one of nickel, cobalt, iron, or a combination thereof, Cr is chromium, Al is aluminum, and Y is yttrium. In a further example, the coating 80 may be STELLITE®. In a further example, the coating 80 may include mullite, silicon carbide, yttrium silicate, or combinations thereof. Additionally, the coating 80 may be a composite of one or more coating layers of different coating materials. The coating 80 may also be a ramming compound (i.e., refractory material) that is applied over the liner 16, with or without anchoring devices such as projections 90 or other protuberances. The coating 80 may be deposited onto the inner wall 40 using any suitable process for the type of coating material that is selected, such as thermal spraying or slip casting. Given this description, one of ordinary skill in the art will recognize suitable deposition processes to meet their particular needs.

The liner 16 may also include projections 90 (one shown), such as studs, protuberances, or similar anchoring devices, that extend inwards from the inner wall 40. For example, the projections 90 may be attached by brazing or other suitable method and function as anchoring devices for slag to adhere to the inner wall 40. The projections 90 may also include the non-slag coating 80 to facilitate formation of the slag layer on the projections 90. In some examples, the projections 90 may be formed from a relatively corrosion resistant metal material, such as a cobalt alloy. Furthermore, application of a ramming compound over the studs may be used to facilitate formation of protective slag layers over the projections 90 and inner wall 40.

In the illustrated example, the liner 16 may also be formed from a relatively corrosion resistant metal material, such as a cobalt alloy. For example, the metal material may be a HAYNES® alloy. Other types of alloys may also be used. Given this description, one of ordinary skill in the art will recognize suitable types of alloys to meet their particular needs.

Figure 4:
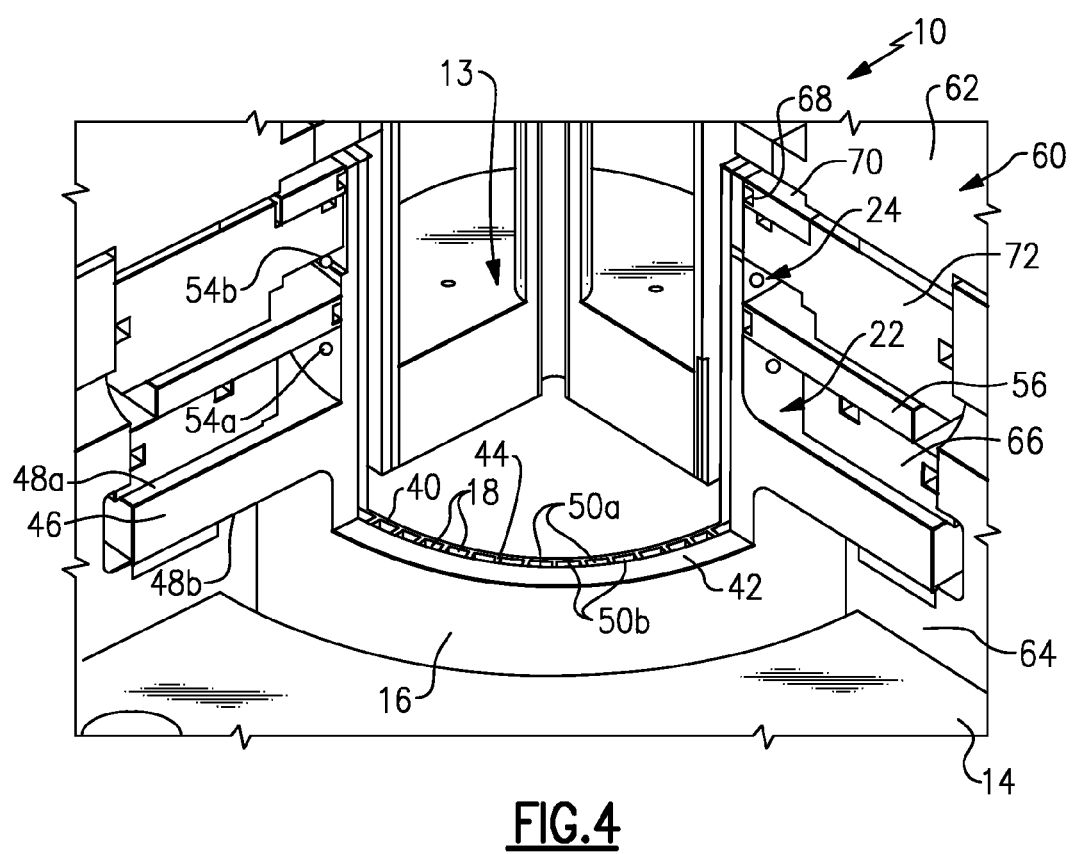
FIG. 4 illustrates a cutaway view of the example reactor vessel system.

FIG. 4 illustrates a sectional view of the reactor vessel system 10, with the liner 16 secured within the reactor vessel 12. In this example, the attachment member 46 is used to secure the liner 16. However, it is to be understood that other methods of supporting and securing the liner 16 may be used.

In the illustrated example, a clamp system 60 secures the liner 16 in the reactor vessel 12. The clamp system 60 includes a first clamp member 62 and a second clamp member 64 that clamp the attachment member 46.

To facilitate clamping, a spacer 66 may be used between the attachment member 46 and a partition wall 56 to prevent collapse and to form a portion of the inlet manifold 22. That is, the upper surface 48a of the attachment member 46 functions as a lower wall of the inlet manifold 22. Additionally, a seal 68 and seal carrier 70 may be used at a top wall 72 of the outlet manifold 24 to facilitate a leak-free connection.

In operation, the pump 26 supplies coolant to the inlet manifold 22. The coolant flows through the coolant entry ports 54a, as represented by arrow 92 (FIG. 1) and into each of the first passages 50a. The coolant flows down the first passages 50a into the turn manifold 52. At the turn manifold 52, the coolant flows into the second passages 50b, as represented by arrow 94. The coolant flows upwards through the second passages 50b and exits through the exit ports 54b into the outlet manifold 24, as represented by arrow 96.

As the coolant flows through liner 16, the coolant absorbs heat from the reactor vessel 12 to maintain a desired temperature at the vessel wall 14 and to maintain the liner inner wall 40 at a temperature conducive to long liner life. The liner 16 facilitates efficient heat absorption by providing a relatively high coolant velocity for a given coolant flow rate. Thus, the efficiency is limited by coolant velocity, not thermal absorption, and the flow rate requirements can be reduced compared to prior liners.

As can be appreciated, the pump 26 may be used to control a flow rate of the coolant to thereby control the degree of cooling provided to the liner 16. Additionally, the size and lengths of the passages 18 may be selected at a design stage to provide a desired flow rate and corresponding degree of cooling. For example, the passages 18 may be approximately 3 ft.-15 ft. (0.9 m-4.6 m) in length. In a further example, the passages 18 are about 3 ft.-5 ft. (0.9 m-1.5 m) in length.

The exemplary liner 16 provides a "two-pass" circulation of the coolant. That is, the coolant passes twice along the length of the liner 16, once down the first passage 50a and for a second time up the second passage 50b. However, in other examples the liner 16 may be configured to include only a single pass, or more than two passes, depending on the cooling needs of a particular application. For example, for a single pass system, the liner 16 may not include the turn manifold 52, and the coolant exit ports 54b and outlet manifold 24 may be located at the bottom of the liner 16 near the second end 49b. Alternatively, for more than two passes, fewer coolant entry ports 54a and coolant exit ports 54b may be used, and the liner 16 may includes turn manifolds 52 at the tops of the passages 18 between pairs of first passages 50a and second passages 50b. Thus, the liner 16 is not limited to the configuration shown and one of ordinary skill in the art having the benefit of this disclosure will recognize configurations that meet their particular needs.

The liner 16 facilitates eliminating or reducing thermal stress. For example, the liner 16 is formed from a metal alloy and the vessel wall 14 is also formed from a metal or metal alloy, which have similar coefficients of thermal expansion and thereby avoid joining of differing materials (e.g., ceramic/metal). Additionally, the liner 16 provides a method of attachment that facilitates reduction of thermal stress. The first end 49a of the liner 16 is fixed relative to the vessel wall 14, and the second end 49b is substantially free to thermally expand and contract relative to the vessel wall 14. That is, the second end 49b is not directly attached to the vessel wall 14 or other components of the reactor vessel system 10. The first end 49a is secured to the vessel wall 14 via the attachment member 46, and the second end 49b is free such that any thermal growth of the liner 16 is unrestricted to thereby avoid causing thermal stress. Thus, any thermal stress is limited to the attachment member 46 and/or sections of the liner 16 immediately adjacent the attachment member 46.

Terms of approximation such as "about" or "approximately" that may be used in this description relative to geometries, distances, temperatures, locations, or the like refer to possible variation in a given value, such as normally accepted variations or tolerances in the art.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can be determined by studying the following claims.

What is claimed is:

1. A reactor vessel liner system comprising:
a liner having an inner wall and an outer wall that define a plurality of passages extending between the inner wall and the outer wall and wherein the liner includes a non-slag coating disposed on the inner wall and the non-slag coating comprises at least one of a metal alloy or a ceramic material; and
an attachment member extending outwards from the outer wall for securing the liner.

2. The reactor vessel liner system as recited in claim 1, wherein the attachment member comprises a flange.

3. The reactor vessel liner system as recited in claim 2, wherein the liner is cylindrical, and the flange extends entirely around a circumference of the liner.

4. The reactor vessel liner system as recited in claim 2, wherein the flange is located proximate to one end of the liner.

5. The reactor vessel liner system as recited in claim 2, wherein the flange comprises a wall of a coolant manifold.

6. The reactor vessel liner system as recited in claim 1, wherein the liner includes a turn manifold fluidly connecting the plurality of passages.

7. The reactor vessel liner system as recited in claim 1, wherein the liner includes a plurality of coolant entry ports fluidly connected with first passages of the plurality of passages, and a plurality of coolant exit ports fluidly connected with second, different passages of the plurality of passages.

8. The reactor vessel liner system as recited in claim 1, wherein the liner is comprised of a metal alloy.

9. The reactor vessel liner system as recited in claim 8, wherein the metal alloy comprises cobalt.

10. The reactor vessel liner system as recited in claim 1, wherein the inner wall includes a plurality of projections extending therefrom.

11. The reactor vessel liner system as recited in claim 10, wherein the projections are covered with a non-slag coating comprised of at least one of a metal alloy, a ceramic material, or a ramming compound.

12. The reactor vessel liner system as recited in claim 1, wherein the outer wall defines the attachment member.

13. The reactor vessel liner system as recited in claim 12, wherein the attachment member is a flange that extends entirely around a circumference of the liner.

14. The reactor vessel liner system as recited in claim 1, wherein the inner wall includes anchoring devices for attachment of slag.

15. The reactor vessel liner system as recited in claim 1, wherein the inner wall includes studs that project radially inwards from the inner wall.

16. A reactor vessel system comprising:
a reactor vessel including a vessel wall;
a liner that lines the vessel wall, the liner having an inner wall and an outer wall that define a plurality of passages extending between the inner wall and the outer wall and wherein the liner includes a non-slag coating disposed on the inner wall and the non-slag coating comprises at least one of a metal alloy or a ceramic material; and
an attachment member extending outwards from the outer wall for securing the liner to the reactor vessel.

17. The reactor vessel system as recited in claim 16, wherein liner includes a fixed end and a free end relative to the reactor vessel, the fixed end being secured to the reactor vessel by the attachment member.

18. The reactor vessel system as recited in claim 16, wherein the attachment member comprises a flange.

19. The reactor vessel system as recited in claim 16, further comprising a clamp securing the liner to the reactor vessel.

20. The reactor vessel system as recited in claim 16, wherein the liner is cylindrical, and a coolant inlet manifold and a coolant outlet manifold each extend entirely around a circumference of the liner.

21. The reactor vessel system as recited in claim 20, wherein the liner includes a plurality of coolant entry ports fluidly connecting the coolant inlet manifold with first passages of the plurality of passages, and a plurality of coolant exit ports fluidly connecting the coolant outlet manifold with second, different passages of the plurality of passages.

* * * * *